United States Patent
Jian et al.

(10) Patent No.: US 9,355,574 B2
(45) Date of Patent: May 31, 2016

(54) 3D VIRTUAL TRAINING SYSTEM AND METHOD

(71) Applicant: SuperD Co. Ltd., Shenzhen (CN)

(72) Inventors: Peiyun Jian, Shenzhen (CN); Dongfang Li, Shenzhen (CN); Ning Liu, Shenzhen (CN); Lei Song, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 195 days.

(21) Appl. No.: 13/862,544

(22) Filed: Apr. 15, 2013

(65) Prior Publication Data

US 2014/0199673 A1    Jul. 17, 2014

(30) Foreign Application Priority Data

Jan. 11, 2013 (CN) .......................... 2013 1 0011150

(51) Int. Cl.
| G09B 23/28 | (2006.01) |
| G06F 3/01  | (2006.01) |
| G06F 3/0484 | (2013.01) |
| G06T 19/20 | (2011.01) |

(52) U.S. Cl.
CPC ............. *G09B 23/28* (2013.01); *G06F 3/016* (2013.01); *G06F 3/04845* (2013.01); *G06T 19/20* (2013.01); *G09B 23/285* (2013.01); *G06T 2219/2016* (2013.01)

(58) Field of Classification Search
USPC ........................................................ 434/262
See application file for complete search history.

(56) References Cited

U.S. PATENT DOCUMENTS

| 6,552,722 | B1 | 4/2003 | Shih et al. | |
| 7,121,832 | B2 * | 10/2006 | Hsieh et al. | 434/262 |
| 2004/0043368 | A1 | 3/2004 | Hsieh | |
| 2007/0167702 | A1 | 7/2007 | Hasser et al. | |

FOREIGN PATENT DOCUMENTS

| CN | 101589416 A | 11/2009 |
| DE | 102010036904 A1 | 2/2012 |
| TW | 558689 B | 10/2003 |
| WO | 2012135653 A1 | 10/2012 |

OTHER PUBLICATIONS

Xiaojun Shen et al. "Haptic-Enabled Telementoring Surgery Simulation" MultiMedia, IEEE, vol. 15, Issue 1, pp. 64-76, Jan.-Mar. 2008.
European Search Report, European Patent Office, May 27, 2014.
European Patent Office Office Action 1 for 14150772.3 May 7, 2015.
The State Intellectual Property Office of the People's Republic of China (SIPO) Office Action 2 for 201310011150.8 Aug. 28, 2015.

* cited by examiner

*Primary Examiner* — Sam Yao
*Assistant Examiner* — Evan Page
(74) *Attorney, Agent, or Firm* — Anova Law Group, PLLC

(57) ABSTRACT

A method is provided for a 3D virtual training system. The 3D virtual training system includes a 3D display screen and an operating device, and the method includes initializing a virtual medical training session to be displayed on the 3D display screen, where 3D display contents include at least a 3D virtual image of a surgery site. The method also includes obtaining user interaction inputs via the operating device and the 3D display screen, and displaying on the 3D display screen a virtual surgery device and a virtual surgery operation on the surgery site by the virtual surgery device. Further, the method includes determining an operation consequence based on the user interaction inputs and the surgery site, rendering the operation consequence based on the surgery site and effects of the virtual surgery operation, and displaying 3D virtual images of the rendered operation consequence on the 3D display screen.

19 Claims, 6 Drawing Sheets

3D VIRTUAL TRAINING SYSTEM AND METHOD

CROSS-REFERENCES TO RELATED APPLICATIONS

This application claims the priority of Chinese patent application number 201310011150.8, filed on Jan. 11, 2013, the entire contents of which are incorporated herein by reference.

FIELD OF THE INVENTION

The present invention generally relates to 3D technologies and, more particularly, to the methods and systems with 3D virtual interaction capabilities.

BACKGROUND

Currently, various solutions for man-machine interactive systems are based on 2D displays. That is, the direct display effect of a user operation is shown in 2D. Some may use shadow and perspective effects, such as objects appearing larger when closer and smaller when farther, to approximately simulate a three-dimensional feel.

With the recent development of the 3D display technology, such 2D display interface may introduce series of operation habits against a user's common sense, because the direct display effect brought to the user by 3D is that all the operation interfaces are either protruding out or recessing from the display screen. Nowadays commonly-used fingers or stylus pens on touch screens can only perform 2D operations on the display screen. For true 3D user interfaces, i.e., interfaces floating in the air or recessing from the screen, these traditional approaches will make the user feel not being able to really touch the actual interfaces.

These problems with the traditional approaches may be more manifested in virtual simulation systems, such as virtual training systems used in a variety of industries, including the medical field, transportation field, and long-distance learning field, etc. Existing technologies in these fields often are lack of a true sense of 3D reality.

The disclosed methods and systems are directed to solve one or more problems set forth above and other problems.

BRIEF SUMMARY OF THE DISCLOSURE

One aspect of the present disclosure includes a method for a 3D virtual training system. The 3D virtual training system includes a 3D display screen and an operating device, and the method includes initializing a virtual medical training session to be displayed on the 3D display screen, where 3D display contents include at least a 3D virtual image of a surgery site. The method also includes obtaining user interaction inputs via the operating device and the 3D display screen, and displaying on the 3D display screen a virtual surgery device and a virtual surgery operation on the surgery site by the virtual surgery device. Further, the method includes determining an operation consequence based on the user interaction inputs and the surgery site, rendering the operation consequence based on the surgery site and effects of the virtual surgery operation, and displaying 3D virtual images of the rendered operation consequence on the 3D display screen.

Another aspect of the present disclosure includes a 3D virtual training system. The 3D virtual training system includes a 3D display screen, a 3D system controller, and an operating device coupled to the 3D system controller to exchange interaction data. The 3D system controller includes an image data module, a virtual operation module, a 3D display module, and a control module. The image data module is used to initialize a virtual medical training session to be displayed on the 3D display screen, where 3D display contents include at least a 3D virtual image of a surgery site. The virtual operation module is used to obtain user interaction inputs via the operating device and the 3D display screen, to process the user interaction inputs for displaying on the 3D display screen a virtual surgery device and a virtual surgery operation on the surgery site by the virtual surgery device, and to determine an operation consequence based on the user interaction inputs and the surgery site. Further, the 3D display module is used to render the operation consequence based on the surgery site and effects of the virtual surgery operation, 3D virtual images of the rendered operation consequence being displayed on the 3D display screen. The control module is used to configure and control the image data module, the virtual operation module, and the 3D display module.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
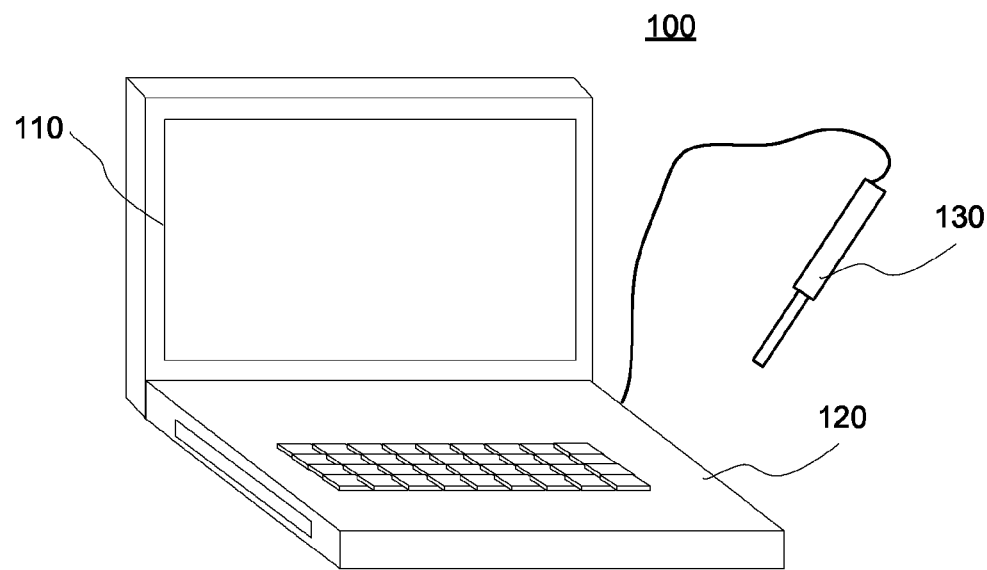
FIG. 1 illustrates an exemplary 3D training system consistent with the disclosed embodiments.

FIG. 1 illustrates an exemplary 3D training system 100 consistent with the disclosed embodiments. As shown in FIG. 1, the 3D training system 100 includes a 3D display screen 110, a 3D system controller 120, and an operating pen 130. Other devices may also be included. Operating pen 130 may be coupled to the 3D system controller 120 such that the operating pen 130 and the 3D system controller 120 can exchange information to complete 3D training operations for a user of the 3D training system 100.

The 3D display screen 110 may include any appropriate type of display screen based on plasma display panel (PDP) display, field emission display (FED), cathode ray tube (CRT) display, liquid crystal display (LCD), organic light emitting diode (OLED) display, or other types of displays. Further, the 3D display screen 110 may also be touch-sensitive, i.e., a touch screen. Other display types may also be used.

The 3D system controller 120 may include any appropriate device capable of processing and displaying 2D and 3D images, such as a computer, a television set, a smart phone, a tablet computer, or a consumer electronic device. Although the 3D system controller 120 is shown as a notebook computer, any terminal device with computing power may be included.

The 3D system controller 120 may include any appropriate structures and components to support operations of the 3D training system 100. For example, 3D system controller 120 may include a processor to control operation of the 3D system controller 120, together with other devices such as random access memory (RAM), read-only memory (ROM), input/output interfaces, sensor driving circuitry, communication interfaces, and storage/database, etc. Computer programs may be stored in the storage and loaded into the memory for execution by the processor to implement various modules and units. Other devices may be added and certain devices may be removed.

The operating pen 130 or operating device 130 may include any appropriate 3D input device in a variety of shapes, such pen, rod, or other human-maneuverable object. During operation of the 3D training system 100, the user may use the operating pen 130 to interact with the 3D system controller 120 via the 3D display screen 110 and based on 3D images and displays. In certain embodiments, certain gesture input device may also be used as the operating pen 130. For example, the user may use one or more fingers to perform user interaction with the 3D training system 100 based on gesture input devices, such as camera or other sensing devices.

Figure 2:
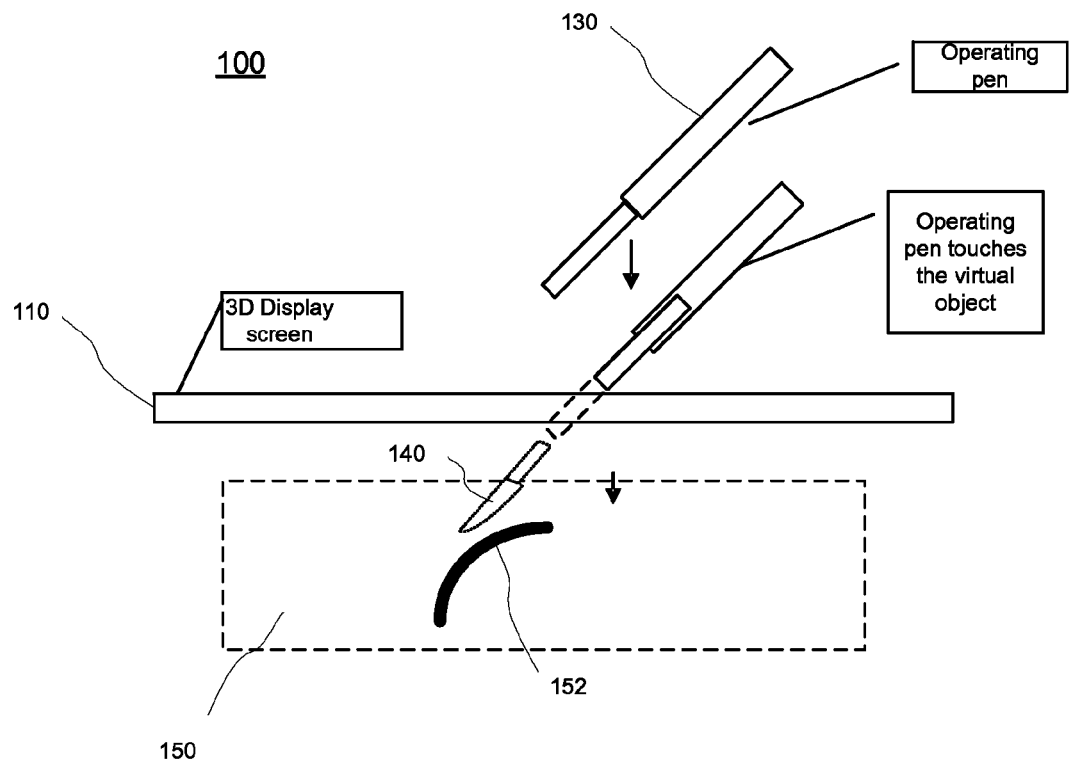
FIG. 2 illustrates a medical training system consistent with the disclosed embodiments.

A variety of training systems may be implemented on the 3D training system 100, such as a medical training system, a driving training system, or other training systems. FIG. 2 illustrates a medical training system 100 consistent with the disclosed embodiments.

As shown in FIG. 2, a medical subject 150 is displayed on the 3D display screen 110, as selected by the user of the medical training system 100. The medical subject 150 may include any appropriate object to be used to simulate a real-world medical subject, such as a human body, a body part(s), or an animal body or parts, etc. The medical subject 150 may be displayed as images recessing from the display screen 110. Further, the medical subject 150 may include a variety of parts or organs, such as a major organ and a blood vessel 152.

After selecting the medical subject 150, the user may use operating pen to virtually perform certain medical operations on the medical subject 150. Specifically, the user may perform a touch operation on the recessing medical subject 150. Because the medical subject 150 is recessed from the display screen, the top of the operating pen 130 touches the display screen before reaching the surface of the medical subject 150.

To allow the user to have more realistic feel, the top portion of the operating pen 130 may be configured as retractable, and a 3D image of the retracted portion of the operating pen 130 may be displayed on the display screen as a desired medical device 140, such as a scalpel, a clamp, or a scissor, etc. Thus, by firmly holding the operating pen 130, the user can maneuver the operating pen 130 to perform a virtual medical operation, such as a virtual surgery, on the medical subject 150.

Figure 3:
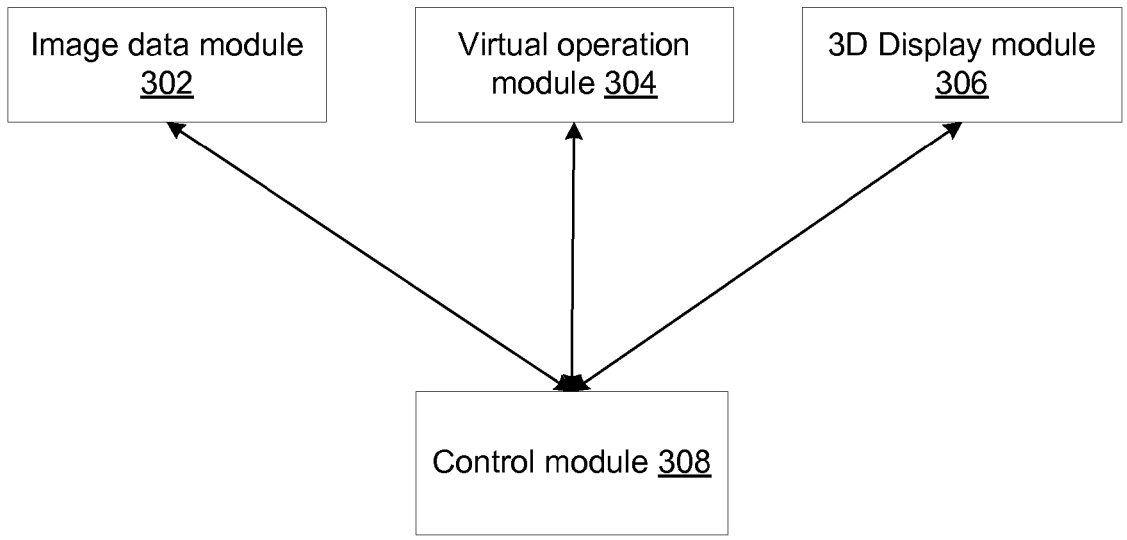
FIG. 3 illustrates a block diagram of an exemplary 3D system controller consistent with the disclosed embodiments.

FIG. 3 illustrates a block diagram of an exemplary 3D system controller 120 consistent with the disclosed embodiments. As shown in FIG. 3, 3D system controller 120 may include an image data module 302, a virtual operation module 304, a 3D display module 306, and a control module 308. Other modules may also be included. These modules may be implemented in software, hardware, or a combination of the software and hardware. Further, the connection lines between the modules are for illustrative purposes only, the various modules may exchange information with one-another to perform various operations.

Image data module 302 may be configured to collect, store, and apply data to build a 3D model of a medical subject 150, which may be a surgery target or a surgery site, such as a human body (e.g., a patient) or an organ of the human body. Such data may include three-dimensional structural information and characteristic information of the surgical site of the patient. The three-dimensional structural information refers to the three-dimensional spatial coordinates of the details of the surgical site descriptions.

For example, in a stomach operation, the surgery site (i.e., the stomach) can be divided into several parts, such as the cardia, fundus, gastric body, antrum, and pylorus, and the three-dimensional structural information includes the spatial distribution (coordinates) of these parts, as well as the spatial coordinates of details within these parts, such as the spatial distribution (coordinates) blood vessels attached to the antrum of the stomach, or the spatial distribution (coordinates) of the mucosal layer of the stomach wall, submucosa, muscularis, and serosa of the gastric body, etc. In short, the three-dimensional structural information includes detailed spatial descriptions of the surgery site based on the surgery contents.

Further, the characteristics information refers to the physiological characteristics information of the surgery site. For example, the characteristics information of the mucous layer of the stomach may include the color of this layer, being made of bone, fat, or other texture, and the strength of its pliability, etc. The characteristics information of the blood vessel may include inside blood pressure, inside blood flow velocity, and the strength of the vessel wall pliability, etc. In short, the characteristics information includes details descriptions of the physiological characteristics of the surgery site. The three-dimensional structural information and the characteristics information are combined to describe and depict the surgery site (e.g., the stomach) based on the requirements of virtual surgery.

The three-dimensional structural information and the characteristics information can be collected with a computer 3D spatial model with values of the characteristics information determined based on experience, or such information can be obtained by a number of 2D scans of actual patients using medical equipment (with 3D spatial structure recovery) or a 3D scan of the surgery site. Further, certain medical examinations (such as measuring blood pressure and lipids, etc.) combined with the patient's basic information (such as gender, age, etc.) as well as some medical experience may also be used to collect the three-dimensional structural information and the characteristics information.

In addition, the image data module 302 may also configured to provide data model of an initial surgery site for a particular illness that requires surgery. More particularly, after the three-dimensional structural information and the characteristics information is obtained, a 3D model of the surgery site can be built. With this 3D model, spatial information and characteristics information on a particular illness, e.g., a tumor or a hole on the stomach, may be obtained and the 3D image of the particular illness is combined with the 3D model of the surgery site to set up the initial surgery site with a particular illness.

Figure 4:
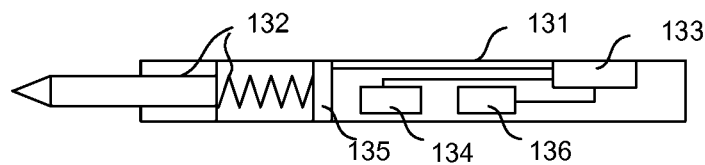
FIG. 4 illustrates an exemplary operating device consistent with the disclosed embodiments.

Returning to FIG. 3, virtual operation module 304 may be configured to process and control operating pen 130 to realize virtual surgery operations based on the operating pen 130. FIG. 4 illustrates an exemplary operating pen 130.

As shown in FIG. 4, operating pen 130 may include a housing 131, retractable head 132, a communication unit 133, a positioning unit 134, a force-feedback unit 135, and retraction-sensing unit 136. Certain components may be omitted and other components may be added. For example, the operating pen 130 may also include accessory components, such as batteries and charging unit (not shown), etc., or the operating pen 130 may be modified or simplified depending on particular applications.

Housing 131 may be in any easy-to-grip shape, such as a pen-like shape, and can be made from any appropriate materials, such as metal or plastic. Retractable head 132 is coupled to the housing 131 in a retractable fashion. A variety of retractable structures may used, such as a spring based structure. Further, the top of the retractable head 132 that touches the 3D display screen is called the contact portion. The far end of the retractable head 132 away from the housing 131 may have a cone shape, and the tip of the cone may be used as the contact portion of the retractable head 132, which is also called the contact point of the operating pen 130.

The communication unit 133 may be electrically coupled to the positioning unit 134, the force-feedback unit 135, and the retraction-sensor unit 136 to facilitate information exchange between the operating pen 130 and the 3D system controller 120. The information exchange may be carried out by using wireless communication means, such as Bluetooth and wireless USB, and/or wired communication means, such as 120 and USB, etc.

Positioning unit 134 is configured to detect in real-time the position and gesture of the operating pen 130 in space, and to send the detected 3D position information to the communication unit 133 for transmission. The positioning unit 134 may include certain sensors, such as motion trajectory sensors and gesture detection sensors. For example, a gyro sensor may be used to obtain motion trajectory data (e.g., position information of the operating pen 130 in space), while an accelerometer may be used to obtain the azimuth data (e.g., gesture information of the operating pen 130). Other sensors may also be used, such as a geomagnetic sensor.

When the operating pen 130 is in an initial state, the initial position of the motion trajectory can be set to the relative position of the positioning unit 134 (or other units) in the reference system. The 3D positioning information detected by the positioning unit 134 may include the 3D position information and the gesture information and other calculated information, such as the 3D position information of the tip of the operating pen 130 or intermediate results calculated based on the 3D position information and the gesture information.

Force-feedback unit 135 is configured to, based on a force-feedback instruction received by the communication unit 133, perform actions to simulate a force feedback, i.e., certain physical reaction to a user action. For example, force-feedback unit 135 may include an electro-mechanical module and, after receiving the force-feedback instruction, simulate a vibration caused by pressing a real button. The operator may then physically feel the operations on the 3D interface, e.g., an immersive feeling. The electro-mechanical module may be an electric vibration motor, an artificial muscle membrane, or any other vibration-simulating device.

Retraction-sensing unit 136 is configured to detect in real-time the retraction length of the tip of the operating pen 130 (i.e., the retreated length of the retractable head 132) and to send the detected retraction information to the communication unit 133 for transmission. The retraction-sensing operation may be implemented by a pressure sensor.

For example, the retractable head 132 may include the tip of the operating pen 130 and an elastic device coupled between the tip and the pressure sensor, such as a spring. When the retraction length of the tip of the operating pen 130 changes, the pressure on the pressure sensor by the elastic device also changes, and the retraction-sensing unit 136 may then convert the pressure information into a corresponding electrical signal and send the converted information to the communication unit 133 for transmission. Thus, the retraction length of the retractable head 132 of the operating pen 130 can be determined based on the value of the electrical signals. Of course, other detection structures may also be used, such as a photoelectric detector.

Figure 5:
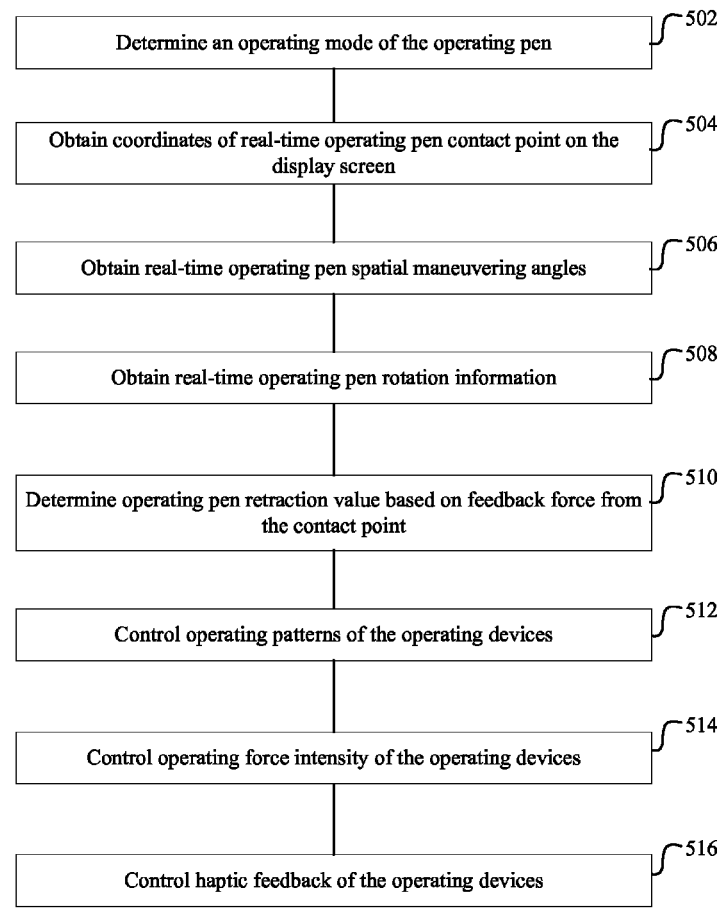
FIG. 5 illustrates exemplary configuration and control operations consistent with the disclosed embodiments.

Returning to FIG. 3, in operation, virtual operation module 304 may perform certain processes to process data from operating pen 130 (e.g., the 3D position information and the gesture information of the operating pen 130) and control the operating pen to implement the virtual surgery operations. In certain embodiments, more than one operating pens 130 may be used to simulate more than one surgery devices used by the user simultaneously. FIG. 5 illustrates exemplary steps or processes performed by the virtual operation module 304 (or together with the operating pen 130). These steps or processes are listed without any particular order or sequence, and certain step(s) or process(es) may be optional.

Figure 6:
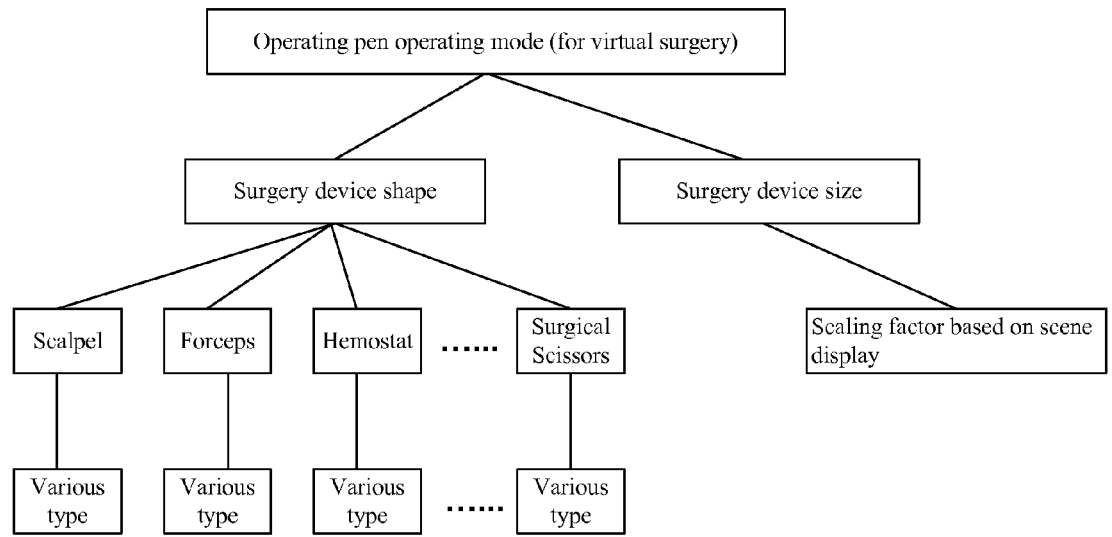
FIG. 6 illustrates an exemplary pre-configuration of the operating device consistent with the disclosed embodiments.

As shown in FIG. 5, when used for medical virtual surgery, an operating mode may be determined prior to the start of the virtual surgery (502). For example, the operating pen 130 may be pre-configured into a desired surgery device, i.e., a surgical instrument. FIG. 6 illustrates an exemplary pre-configuration of the operating pen 130.

As shown in FIG. 6, when pre-configuring the operating pen 130 into a surgery device, a surgery device shape is determined. The shape of the surgical instrument or surgery device may include various types of scalpels, various types of surgery tweezers, and various types of surgical hemostat, etc.

At the same time, the surgery device size may also be determined. The size of the surgery device may refer to size of virtual surgery device after zoom-in or zoom-out operations based on the needs of various surgery scenes. For example, when minimally invasive surgery is simulated, a zoom-in operation is applied to the surgical site, the size of the surgery device may also need to be zoomed in to appear similar to the actual surgery. The pre-configured surgery device (with the shape and size) is displayed to the user during the virtual surgery as the surgery device 140 (FIG. 2).

Figure 7:
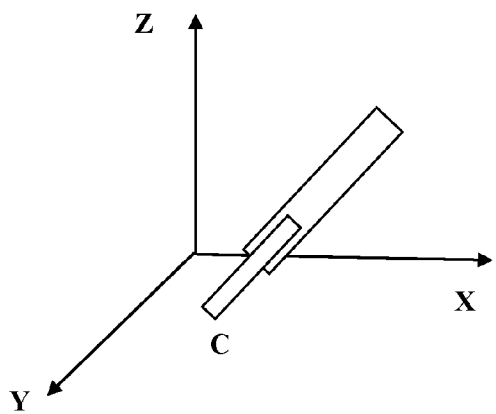
FIG. 7 illustrates an operating pen contract point in an XYZ three-dimensional coordinate system consistent with the disclosed embodiments.

Returning to FIG. 5, when the operating pen 130 is used by the user and the operating pen 130 touches the 3D display screen, the coordinates of operating pen contact point on the display screen may be obtained in real-time (504). FIG. 7 illustrates an operating pen contract point in an XYZ three-dimensional coordinate system.

As shown in FIG. 7, when the operating pen 130 touches the display screen at the contact point C, the plane coordinates of the contact point C can be obtained using a touch-sensing device of the 3D display screen in real-time. If the plane of the display screen is defined as a plane with z=0 in the spatial coordinate system, the contact point C can also be represented as spatial coordinates.

Further, referring to FIG. 5 and FIG. 7, using a sensing device on the operating pen 130 (e.g., a gyroscope or a geomagnetic sensor) or other means (e.g., monitoring camera), the spatial maneuvering angle of the operating pen 130 may be obtained in real-time (506). For example, the spatial maneuvering angle of the operating pen 130 may be determined as the angles of the operating pen with respect to the x, y, z-axis.

Further, using a rotation sensing device on the operating pen 130 (e.g., a gyroscope) or other means, a rotation operation of the operating pen 130 may be determined (508). For example, when the operating mode of the operating pen 130 is a scalpel with the fixed size and shape, the blade facing direction is set as the initial direction of the scalpel blade, rotating the operating pen 130 can change the facing direction of the scalpel.

In addition, based on the sensed contacting force at the contact point C between the operating pen and the 3D display screen, the degree of retraction of the operating pen 130 may be calculated in real-time (510). The degree of retraction (or the retraction value) of any point on the operating pen 130 may be represented as the value of the Z-coordinate value of that point. For example, the larger the contact force (or feedback force) at point C, the smaller the Z-coordinate value of that point, i.e., farther recessing from the 3D display screen. Similarly, the smaller the contacting force at point C, the larger the Z-coordinate value of that point, i.e., closer to the 3D display screen. When there is no contacting force or the contact force is below a predetermined threshold, the virtual surgery device does not appear in the virtual scene on the display screen. When there is contacting force or the contact force is above a predetermined threshold, the virtual surgery device is displayed on the display screen based on the degree of retraction. The contacting force or feedback force may be obtained based on a pressure-sensitive device on the display screen, or based on retraction ratio of the operating pen 130, etc.

Further, the operating pattern of the virtual surgery device may be controlled by force feedback from one or more predetermined areas of the operating pen 130 (512). For example, one or more button (or virtual buttons) may be configured on the operating pen operating pattern. For the actions of "clamped" and "open" of a surgical tweezers, a virtual button of "open" may be implemented. When the "open" button is pressed, the virtual surgery device (i.e., a virtual surgical tweezers) may execute the "open" operation. The speed and time is related to the force and time when pressing the "open" button. Further, a "clamped" virtual button can also be implemented. When the "clamped" button is pressed, the virtual surgery device executes the "clamped" operation. The speed and time is related to the force and time when pressing the "clamped" button. Of course, the "open" and "clamped" operations cannot be performed without limitation, and may be restricted by a maximum open angle and clamping angle boundary control. These virtual buttons may be automatically switched according to the operating mode of the operating pen 130.

The operating force intensity of the surgery device may also be controlled by force feedback from a predetermined area of the operating pen 130 (514). For example, if the operating mode of the operating pen 130 is a scalpel, the force intensity for cutting fat tissue with the scalpel is different from the force intensity for cutting a bone structure. The degree of how firmly the user is holding the operating pen 130 at the predetermined area can indicate the force intensity of using the scalpel, and the force feedback from the predetermined area is also in proportional to the force applied on the scalpel.

Further, the operating pen 130 may have a haptic feedback device. The haptic feedback device may be controlled to give a haptic feedback corresponding to an interaction between the virtual surgery device and the 3D contents of the surgery target or surgery site (516). For example, if the virtual scalpel accidentally cuts to the bone structure when cutting the fat tissue, the operating pen 130 may vibrate to give a haptic feedback to the user.

Returning to FIG. 3, the 3D system controller 120 also include a 3D display module 306 configured to control 3D display functions of the 3D training system 100 during initial configuration and during run-time operation. For example, the 3D display module 306 may implement a 3D display requiring wearing special glasses, a 3D display requiring separate spectacles for the left and right eyes, a fixed-point autostereoscopic 3D display or a tracking-enhanced autostereoscopic 3D display, or a holographic 3D display, etc. For illustrative purposes, an autostereoscopic 3D display with eye-tracking is used herein.

Figure 8:
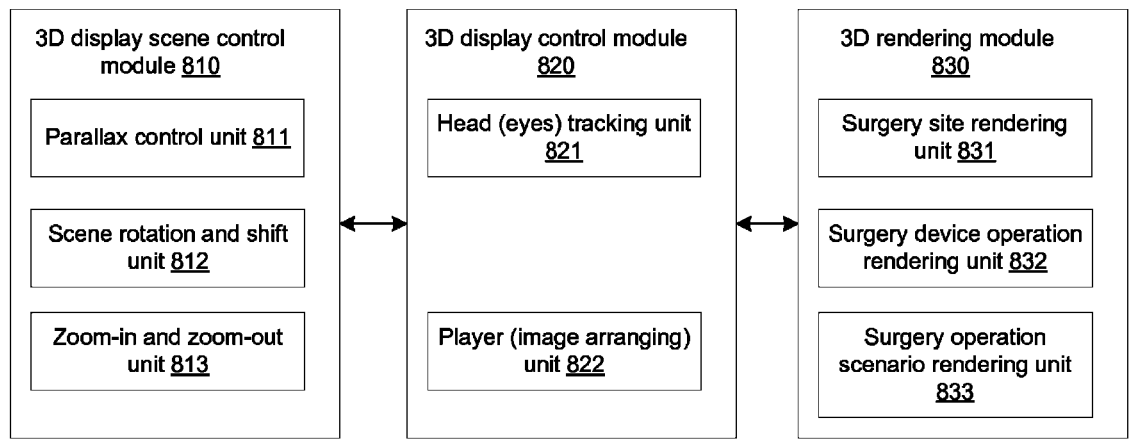
FIG. 8 illustrates an exemplary 3D display module consistent with the disclosed embodiments.

The 3D display module 306 may include various modules and units to realize these 3D display functions. FIG. 8 illustrates an exemplary 3D display module 306.

As shown in FIG. 8, the 3D display module 306 may include a 3D display scene control module 810, a 3D display control module 820, and a 3D rendering module 830. The 3D display scene control module 810 may include a parallax control unit 811, a scene rotation and shift unit 812, a zoom-in and zoom-out unit 813. The 3D display control module 820 may include a head (eye) tracking unit 821 and a player unit 822. The 3D rendering module 830 may include a surgery site rendering unit 831, a surgery device operation rendering unit 832, and a surgery operation scenario rendering unit 833. Certain modules/units may be omitted and other modules/units may be included.

The 3D display control module 820 may be configured to control display of 3D images. For example, because the 3D display contents in the medical training system are all virtual (i.e., recessed from the display screen), including surgical site and surgical devices, the 3D display control module 820 may use motion parallax to achieve holographic effect. That is, based on the spatial positions of the left eye and the right eye obtained by the head-tracking unit 821, and the left image and the right image respectively for the left eye and the right eye can be calculated by the 3D display control module 820 based on the spatial positions of the left eye and the right eye. The left image and the right image may represent the projection of the spatial scene information of the surgery site and the surgery device according to the view angles of the left eye and the right eye, respectively.

The calculated left image and the right image are sent to the player unit 822 in real-time to be arranged. The player unit 822 may be a two-image (i.e., the left image and the right image) player or may be a multi-image player. The images are arranged in such a way to implement the holographic effect, i.e., different contents can be displayed when the user views from different angles.

The 3D display scene control module 810 may be configured to control the display of the operation scene in real-time, such as the display of the surgery site and the surgery device. For example, parallax control unit 811 may control the degree of recessing and/or protruding of the 3D display contents. The scene rotation and shift unit 812 may determine the rotation and/or shifting of the display scene based on the requirement of the virtual surgery, and to control the rotation and/or shifting of the 3D display contents accordingly. Further, the zoom-in and zoom-out unit 813 may determine a scaling factor for zoom in or zoom out of the display scene based on the surgery site in the virtual surgery, and to control the zoom in or zoom out of the surgery scene. At the same time, the zoom-in and zoom-out unit 813 may also apply the same scaling factor to zoom in or zoom out the surgery device as to match the surgery site.

Further, the 3D rendering module 830 may be configured to render images with special effects of virtual operations. For example, the surgery site rendering unit 831 may render spatial images of the surgery site under the virtual surgical operation in real-time. The surgery device operation rendering unit 832 may render spatial images of the surgery device with particular operating mode and operating condition.

The surgery operation scenario rendering unit 833 may render spatial images of certain operational scenarios during the user interaction (i.e., the virtual surgery). For example, the surgery operation scenario rendering unit 833 may render spatial images of an accidental event during the 3D operation. That is, when the operating pen or the surgery device interact with the 3D display contents during a virtual surgery, certain unexpected contact between the surgery device and the 3D display contents may trigger certain events or accidental events that need to be rendered and displayed to the user.

For example, if the operating mode of the operating pen 130 is a scalpel, during the virtual surgery, the 3D rendering module 830 may detect that the blade of the virtual scalpel cuts a blood vessel, i.e., the spatial coordinates of the blade of the scalpel overlap with the spatial coordinates of the blood vessel. After detecting such overlapping, the 3D rendering module 830 may trigger an accidental event, and the surgery operation scenario rendering unit 833 may render spatial images of the operating scenario of the blood vessel being cut, such as shape and color changes surrounding the blood vessel to simulate the effects of the damaged blood vessel.

Figure 9:
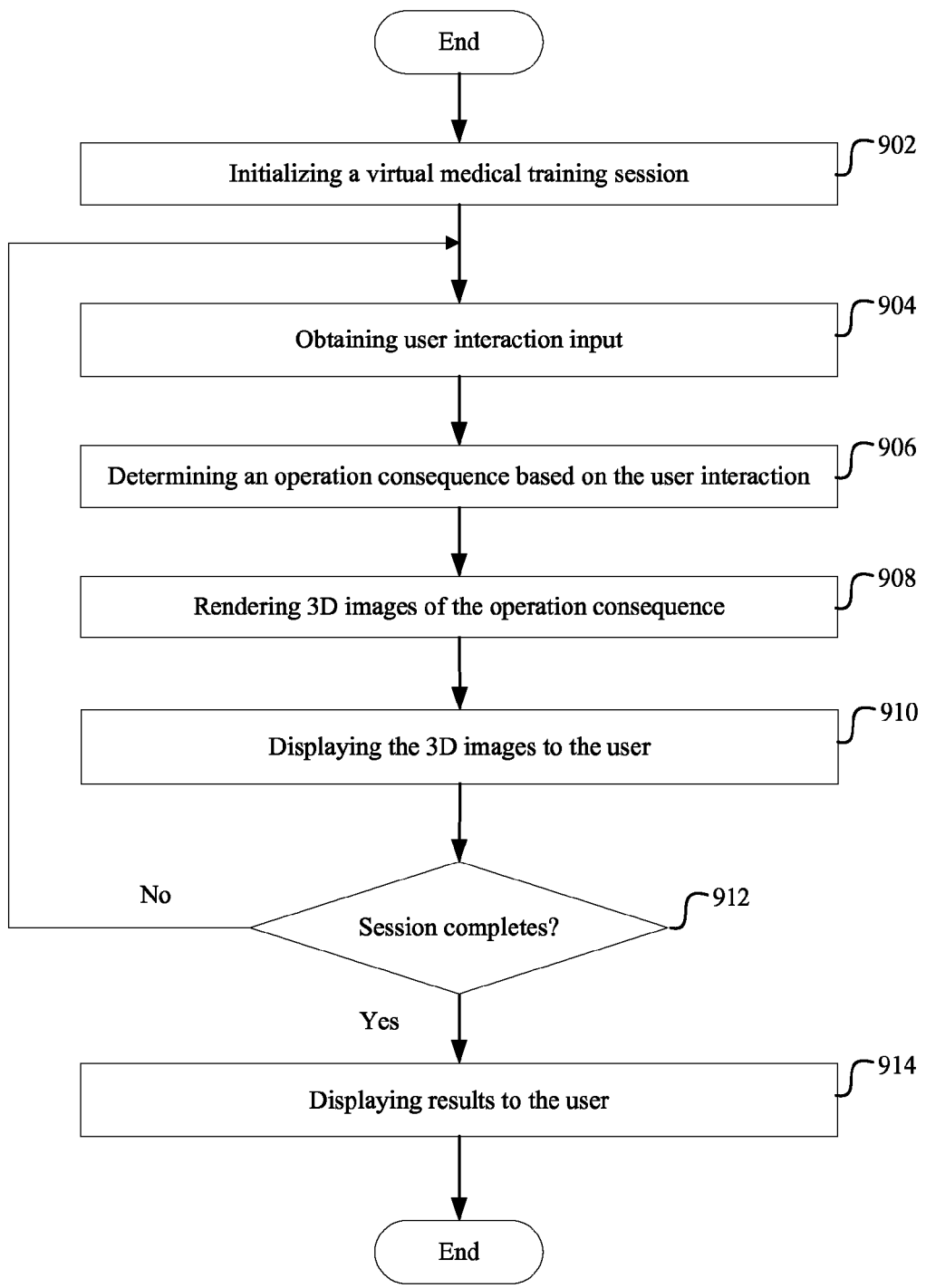
FIG. 9 illustrates an exemplary operation process consistent with the disclosed embodiments.

Returning to FIG. 3, the 3D system controller 120 may also include a control module 308 configured to control operations of modules with the 3D system controller 120 and/or other modules and devices within the training system 100. That is, the control module 308 may perform certain processes to implement the virtual surgery functions (or other training functions) of the 3D training system 100. FIG. 9 illustrates an exemplary operation process 900 consistent with the disclosed embodiments.

As shown in FIG. 9, at the beginning of the process 900, the 3D training system 100 may initialize a virtual medical training session (902). Specifically, the 3D training system 100 may obtain a user input to request start of a medical training session, such as a virtual surgery operation. The user may also input a choice of the surgery target, surgery site, and surgery conditions, etc.

After receiving the user inputs, the 3D training system 100 may obtain the 3D display contents of the surgery target, surgery site, and surgery conditions, etc., and may also display the 3D display contents to the user (as a medical object). At the same time, the 3D training system 100 may obtain user configuration of the operating pen 130, such as the operating mode, operating pattern, and other configurations of the operating pen 130 such that the operating pen 130 can be configured into a desired surgery device.

After the initialization, the user may start the surgery session by operating the operating pen 130 and to interact with the 3D display contents of the 3D training system 100. The 3D training system 100 may obtain the user interaction input (904). For example, the 3D training system 100 may obtain various position, force feedback, and spatial information from the operating pen 130 (e.g., the communication unit 133), and may obtain various coordinates of the display screen on the contact point between the operating pen 130 and the 3D display screen.

The medical training session may use 3D display contents recessed from the 3D display screen, and the user may use the touch operation of the operating pen 130 to perform various operations within the virtual medical operation. During touch operations, the top of the operating pen 100 touches the display screen and the degree of the retraction may be determined by the 3D training system 100, along with posture and other spatial information of the operating pen 130.

More particularly, the 3D training system 100 may determine the operating mode of the operating pen 130, real-time coordinates of the contact point between the operating pen 130 and the display screen, real-time spatial operation angles of the operating pen 130, retraction values and force feedback of the operating pen 130, operating patterns of the virtual surgery instrument or device, operating force intensity of the surgery device, and haptic feedback of the surgery device. Based on such information, the 3D training system 100 may calculate spatial position and state information of the surgery device.

For example, if the operating mode is a scalpel, the spatial positions of various portions of the scalpel can be calculated, including spatial posture and the facing direction of the blade of the scalpel, etc. A virtual scalpel may then be displayed as recessed from the 3D display screen and following further user interactions based on the operating pen 130. The operating patterns, force intensity, and force feedback can also be used to calculate the user's operating strength and speed, etc.

Further, based on the user interaction and the 3D display contents of the surgery site, the 3D training system 100 may determine an operation consequence (906). Such operation consequence may include a normal surgical operation caused by the user interaction (i.e., operating the surgery device) and may also include an accidental surgical operation caused by the user's unintentional interaction (i.e., accidently cutting other tissues). The operation consequence may be associated with various images and other medium data, such as sound. The various images and other medium data may be retrieved and presented to user subsequently.

To present the operation consequence to the user, the 3D training system 100 may render 3D images of the operation consequence (908). For example, the 3D training system 100 may render 3D images of a surgery result of a surgery site based on the 3D images of the surgery site and the operation consequence. After the 3D images are rendered, the rendered 3D images may be displayed to the user on a 3D display screen (910).

Further, the 3D training system 100 may determine whether the virtual training session is completed (912). If the 3D training system 100 determines that the virtual training session is not completed (912; no), the process continues from 904. On the other hand, if the 3D training system 100 determines that the virtual training session is completed (912; yes), the 3D training system 100 may optionally further display results of the virtual training session to the user (914), including results of the surgery operation and/or statistical data of the virtual training session performed by the user.

By using the disclosed systems and methods, many new 3D user interaction and training applications can be implemented. The user can have a more realistic experience when interacting or control the 3D medical or other training programs. Other advantageous applications, modifications, substitutions, improvements are also obvious to those skilled in the art.

What is claimed is:

1. A method for a 3D virtual training system including a 3D display screen and a physical operating device, comprising:
   initializing a virtual medical training session to be displayed on the 3D display screen, 3D display contents including at least a 3D virtual image of a surgery site;
   configuring an operating mode of the physical operating device to be a desired virtual surgery device from a plurality of predefined virtual surgery devices for the physical operating device, wherein a 3D image of a retractable portion of the physical operating device is displayed on the 3D display screen as the desired virtual surgery device without changing the physical operating device;

obtaining user interaction inputs via the physical operating device and the 3D display screen to determine at least a contact condition of the physical operating device with respect to the 3D display screen, and displaying on the 3D display screen the desired virtual surgery device based on the contact condition of the physical operating device and a virtual surgery operation on the surgery site by the virtual surgery device;

determining an operation consequence based on the user interaction inputs and the surgery site;

rendering the operation consequence based on the surgery site and effects of the virtual surgery operation; and displaying 3D virtual images of the rendered operation consequence on the 3D display screen.

2. The method for a 3D virtual training system according to claim 1, wherein configuring an operating mode of the physical operating device further includes:

configuring a shape of the desired virtual surgery device from a plurality of predefined shapes of the desired virtual surgery device.

3. The method for a 3D virtual training system according to claim 1, wherein obtaining user interaction inputs via the physical operating device and the 3D display screen includes:

determining a spatial position of a contact point between an operating device and the 3D display screen;

determining spatial maneuvering angle of the physical operating device; and determining a rotation operation of the physical operating device.

4. The method for a 3D virtual training system according to claim 1, wherein obtaining user interaction inputs via the physical operating device and the 3D display screen further includes:

sensing a contacting force at a contact point between the physical operating device and the 3D display screen; and calculating a degree of retraction of the physical operating device with respect to the 3D display screen based on the contacting force.

5. The method for a 3D virtual training system according to claim 4, wherein displaying on the 3D display screen the desired virtual surgery device based on the contact condition of the physical operating device further includes:

setting a threshold for the contacting force between the physical operating device and the 3D display screen;

when the contacting force is above the threshold, displaying the desired virtual surgery device on the 3D display screen based on the degree of retraction; and when the contacting force is below the threshold, not displaying the desired virtual surgery device on the 3D display screen.

6. The method for a 3D virtual training system according to claim 1, wherein obtaining user interaction inputs via the physical operating device and the 3D display screen further includes:

controlling an operating pattern of the desired virtual surgery device or an operating force intensity based on force feedback from one or more predetermined areas of the physical operating device, wherein the physical operating device have one or more buttons for performing corresponding actions based on the operating pattern of the desired virtual surgery device, wherein the one or more buttons include an open button and a clamped button implemented for actions of "open" and "clamped" of a virtual surgical tweezers.

7. The method for a 3D virtual training system according to claim 1, wherein rendering the operation consequence based on the surgery site and effects of the virtual surgery operation further includes:

determining a scaling factor for a display scene of the virtual surgery operation based on the surgery site;

using the scaling factor to control the display scene and a zoom-in or zoom-out operation on the desired virtual surgery device such that the desired virtual surgery device matches the display scene.

8. The method for a 3D virtual training system according to claim 1, wherein determining an operation consequence based on the user interaction inputs and the surgery site further includes:

determining the spatial position of the desired virtual surgery device based on the user interaction inputs;

determining a spatial position of the surgery site corresponding to the desired virtual surgery device;

comparing the spatial position of the desired virtual surgery device and the spatial position of the surgery site;

triggering an operation event based on a comparing result; and determining the operation consequence of the operation event.

9. The method for a 3D virtual training system according to claim 1, wherein the display contents further include:

statistic data of the virtual surgery operation and results of the medical training session.

10. A 3D virtual training system, comprising:

a 3D display screen;

a 3D system controller;

a physical operating device coupled to the 3D system controller to exchange interaction data, wherein the 3D system controller includes an image data module, a virtual operation module, a 3D display module, and a control module;

the image data module is used to initialize a virtual medical training session to be displayed on the 3D display screen, 3D display contents including at least a 3D virtual image of a surgery site;

the virtual operation module is used to configure an operating mode of the physical operating device to be a desired virtual surgery device from a plurality of predefined virtual surgery devices for the physical operating device, wherein a 3D image of a retractable portion of the physical operating device is displayed on the 3D display screen as the desired virtual surgery device without changing the physical operating device, to obtain user interaction inputs via the physical operating device and the 3D display screen to determine at least a contact condition of the physical operating device with respect to the 3D display screen, to process the user interaction inputs for displaying on the 3D display screen a desired virtual surgery device based on the contact condition of the physical operating device and a virtual surgery operation on the surgery site by the desired virtual surgery device, and to determine an operation consequence based on the user interaction inputs and the surgery site;

the 3D display module is used to render the operation consequence based on the surgery site and effects of the virtual surgery operation, 3D virtual images of the rendered operation consequence being displayed on the 3D display screen; and the control module is used to configure and control the image data module, the virtual operation module, and the 3D display module.

11. The 3D virtual training system according to claim 10, wherein the virtual operation module is used to:
configuring a shape of the desired virtual surgery device from a plurality of predefined shapes of the desired virtual surgery device.

12. The 3D virtual training system according to claim 10, wherein the virtual operation module is used to perform at least one of:
determining a spatial position of a contact point between the physical operating device and the 3D display screen;
determining spatial maneuvering angle of the physical operating device; and
determining a rotation operation of the physical operating device.

13. The 3D virtual training system according to claim 10, wherein the virtual operation module is used to:
sense a contacting force at a contact point between the physical operating device and the 3D display screen; and
calculate a degree of retraction of the physical operating device with respect to the 3D display screen based on the contacting force.

14. The 3D virtual training system according to claim 13, wherein the virtual operation module is used to:
set a threshold for the contacting force between the physical operating device and the 3D display screen;
when the contacting force is above the threshold, display the desired virtual surgery device on the 3D display screen based on the degree of retraction; and
when the contacting force is below the threshold, not display the desired virtual surgery device on the 3D display screen.

15. The 3D virtual training system according to claim 10, wherein the virtual operation module is used to:
determine a scaling factor for a display scene of the virtual surgery operation based on the surgery site;
use the scaling factor to control the display scene and a zoom-in or zoom-out operation on the desired virtual surgery device such that the desired virtual surgery device matches the display scene.

16. The 3D virtual training system according to claim 10, wherein the virtual operation module is used to:
determine the spatial position of the desired virtual surgery device based on the user interaction inputs;
determine a spatial position of the surgery site corresponding to the desired virtual surgery device;
compare the spatial position of the desired virtual surgery device and the spatial position of the surgery site;
trigger an operation event based on a comparing result; and
determine the operation consequence of the operation event.

17. The 3D virtual training system according to claim 10, wherein the virtual operation module is used to:
control an operating pattern of the desired virtual surgery device or an operating force intensity based on force feedback from one or more predetermined areas of the physical operating device,
wherein the physical operating device have one or more buttons for performing corresponding actions based on the operating pattern of the desired virtual surgery device,
wherein the physical operating device have one or more buttons for performing corresponding actions based on the operating pattern of the desired virtual surgery device,
wherein the one or more buttons include an open button and a clamped button implemented for actions of "open" and "clamped" of a virtual surgical tweezers.

18. The method for a 3D virtual training system according to claim 1, wherein the physical operating device is a gesture input device.

19. The method for a 3D virtual training system according to claim 1, wherein the virtual surgery device is a scalpel, and the method further includes:
detecting that spatial coordinates of a blade of the virtual surgery device overlap with spatial coordinates of a blood vessel of the surgery site;
triggering an accidental event; and
rendering a spatial image of an operating scenario of the blood vessel being cut, including shape and color changes surrounding the blood vessel.

* * * * *